(12) United States Patent
Klein (10) Patent No.: US 7,793,461 B2
(45) Date of Patent: Sep. 14, 2010

(54) INSECT BARRIER WITH DISPOSABLE ADHESIVE MEDIA

(76) Inventor: Arnold G. Klein, P.O. Box 724, Sandia Park, NM (US) 87047

( * ) Notice: Subject to any disclaimer, the term of this patent is extended or adjusted under 35 U.S.C. 154(b) by 304 days.

(21) Appl. No.: 11/406,865

(22) Filed: Apr. 19, 2006

(65) Prior Publication Data

US 2006/0185224 A1 Aug. 24, 2006

Related U.S. Application Data

(63) Continuation-in-part of application No. 10/753,660, filed on Jan. 9, 2004, now abandoned.

(60) Provisional application No. 60/443,368, filed on Jan. 30, 2003.

(51) Int. Cl.
*A01M 1/14* (2006.01)

(52) U.S. Cl. .............................. 43/114; 43/107; 43/121; 43/109; 43/132.1; 119/72

(58) Field of Classification Search ........................ None
See application file for complete search history.

(56) References Cited

U.S. PATENT DOCUMENTS

| | | | | |
|---|---|---|---|---|
| 1,405,822 A * | 2/1922 | Erickson | ........................ | 43/109 |
| 2,062,789 A * | 12/1936 | Keller | .......................... | 47/30 |
| 2,233,832 A * | 3/1941 | Byrd | .......................... | 43/107 |
| 4,691,665 A * | 9/1987 | Hefner | ........................ | 119/77 |
| 4,800,671 A * | 1/1989 | Olson | .......................... | 43/108 |
| 5,111,610 A * | 5/1992 | Morisset | ..................... | 43/132.1 |
| 6,223,463 B1 * | 5/2001 | Carlson et al. | ................ | 43/108 |
| 6,463,878 B1 * | 10/2002 | Moody | ....................... | 119/57.9 |

* cited by examiner

*Primary Examiner*—Christopher P Ellis
(74) *Attorney, Agent, or Firm*—Robert W. Becker (57) ABSTRACT

A simple device for use with nectar type bird feeders that effectively prevents ant and other insect contamination. In several embodiments, the device uses a disposable media that is coated with a non-drying adhesive. In application the device is either placed interposed between the nectar feeder and the feeder support or is adapted to securely fit over the feeder support. The insects (primarily ants) are prevented from contaminating the feeder as they will not cross the non-drying adhesive barrier. The replaceable adhesive media inserts and/or peel away layers can be very conveniently replaced as they become contaminated or dust covered. Alternatively (for ultimate consumer convenience) the device may be made completely disposable with the non-drying adhesive applied directly to the device interior surface(s).

11 Claims, 8 Drawing Sheets

INSECT BARRIER WITH DISPOSABLE ADHESIVE MEDIA

This is a CIP application of U.S. patent application Ser. No. 10/753,660, filed Jan. 9, 2004 now abandoned.

I also claim the benefit of provisional patent application No. 60/443,368 filed Jan. 30, 2003.

FIELD OF THE INVENTION

The present invention relates to a device to be used to prevent insects (primarily ants) from entering and contaminating nectar type bird feeders.

BACKGROUND OF THE INVENTION

Nectar, or sugar water type bird feeders are extremely prone to insect, especially ant, contamination. There are numerous products that are commercially available to prevent ants from contaminating nectar type bird feeders. One of the most common barriers is a water "moat" hung above the feeder or designed integrally into the feeder (Ref. U.S. Pat. Nos. 4,691,665, 4,901,673, 5,507,249 and 6,463,878). While water moats are effective, they require regular monitoring to fill and clean them. In hot, dry regions, water moats will require daily refilling and they frequently will go dry before the nectar in the feeder is replaced. Water moats work well, but many people find the maintenance and cleaning of them inconvenient. There are also physical barrier means to prevent inset contamination as detailed in my U.S. Pat. Nos. 5,640,927, 5,806,460 and 6,012,414 for "Nectar Feeder Access Devices". While these devices are very effective, they also require regular cleaning.

There are also some "home remedy" measures such as putting vegetable oil or petroleum jelly on the feeder hanging cord, or around the perimeter of the feeder ports. There is available commercially a plastic or wooden "bell shaped" device which hangs between the feeder and the feeder hanging point into which the underside, petroleum jelly is applied. These home methods are marginally effective in the short term, but they tend to be very messy, require frequent cleaning, and the oil or petroleum jelly are prone to becoming rancid. The petroleum jelly often melts in hot weather conditions. Unfortunately, the petroleum jelly and/or vegetable oil usually end up on the feeder as they are prone to migration and, being only marginally effective, especially with larger insects (ants), they can even be tracked back to the feeder. Finally, the petroleum jelly and/or vegetable oil attract dirt which results in the need for frequent and relatively difficult cleaning and the need for regular re-application.

One of the most popular products for the prevention of ant contamination is described in U.S. Pat. Nos. 4,782,662 4,890,416 and 5,274,950. This product marketed under the name Ant Guard™ is very convenient and effective at preventing ants from getting into nectar feeders. Unfortunately, this product uses a "absorbent disk" treated with the wide spectrum insecticide "Permethrin". The Permethrin insecticide is very toxic to bees and fish. There are numerous warning messages on the packaging including "CAUTION", "KEEP OUT OF REACH OF CHILDREN", "ENVIRONMENTAL HAZARDS—The Active ingredients in this disk are toxic to fish", etc., etc. Due to the fact that this product uses an insecticide barrier, it is simply unacceptable to many bird feeding consumers and many specialty bird feeding retailers. The bird feeding consumer is typically a very environmentally conscious consumer, who prefers a non-insecticide, nontoxic solution to solving their insect (ant) contamination problems.

SUMMARY OF THE INVENTION

The object of the present invention is to solve the problem of insect (especially ants) contamination of nectar type bird feeders with a simple, low-cost, and convenient device that requires a minimum maintenance effort and which is environmentally safe and non-toxic. The key to this problem solution is the use of a disposable media, such as paper, vinyl, Tyvek®, Teslin® thin-flexible foam, Pet-G®, PETE (polyethylene terephthalate), etc. that is pre-treated with a relatively tacky, non-toxic, non-drying adhesive as is commonly found on the better grades of flypaper. This adhesive treated media (the best insect deterring adhesive formulations are colorless, odorless, and are not petroleum based) is highly effective as an insect barrier when placed, with no alternative routes, between the nectar feeder and its hanging point or other mounting structure.

The advantages of using the insect deterring adhesive coated disposable media for the insect barrier device are that it is very convenient, (neat-no sticky stuff to clean up or apply), long lasting protection (months), completely non-toxic, economical (very low cost), has multiple feeding season service capability, and finally, can be manufactured in numerous aesthetically pleasing product configurations. The adhesive media ant barrier device has been tested in an extremely dusty area, and found to be effective for a period of 2 to 4 months which is much longer than the aforementioned methods which can require replacement or maintenance on as frequent as a daily basis. The device or media replacement is simple and neat, there is no associated cleaning. The device will provide multiple season protection by simply including a number of disposable and or replaceable, low cost, adhesively coated media components. User instructions, adhesive free handling zones, and attractive graphics can easily be incorporated onto the disposable adhesive media devices. It is important to note, that ants and other crawling insects only rarely become entrapped in the non-drying adhesive, they most typically pull away and retreat from the barrier before they get completely stuck.

In recognition of the increasing trend for many consumer products are designed and marketed to be completely disposable, some additional "completely disposable invention embodiments are disclosed. These disposable insect barrier devices would be supplied with a pre-applied coating of non-drying adhesive and would typically have an effective service life of one feeding season. The ultimate convenience of these device may actually have wide consumer appeal as there would no longer be any necessity for the consumer to install, replace or otherwise handle any non-drying adhesive coated media.

BRIEF DESCRIPTION OF THE DRAWINGS

The following drawings are intended to demonstrate the numerous product configurations that the ANT BARRIER WITH DISPOSABLE ADHESIVE MEDIA device might have. These figures are not intended to show all of the potential device embodiments, but rather to demonstrate the design versatility that using a disposable media with a non-drying adhesive coating will allow.

DETAILED DESCRIPTION

Figure 1:
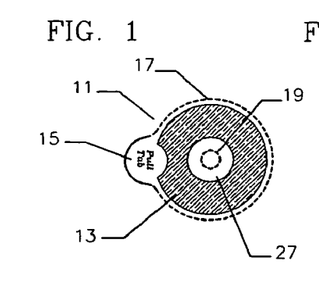
FIG. 1 depicts a top view of the insect barrier that is totally disposable.
Figures 2, 3:
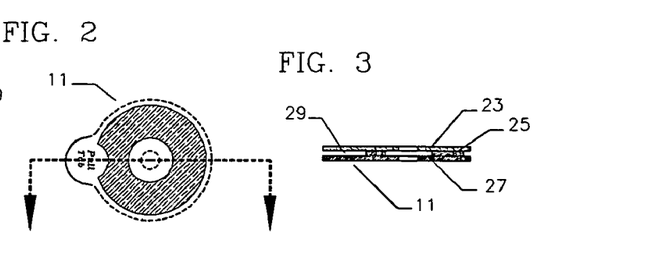
FIG. 2 depicts a top view of the insect barrier of FIG. 1 with a cross section line passing through the center.
FIG. 3 depicts the insect barrier of FIG. 2 in a side cross sectional view.
Figure 4:
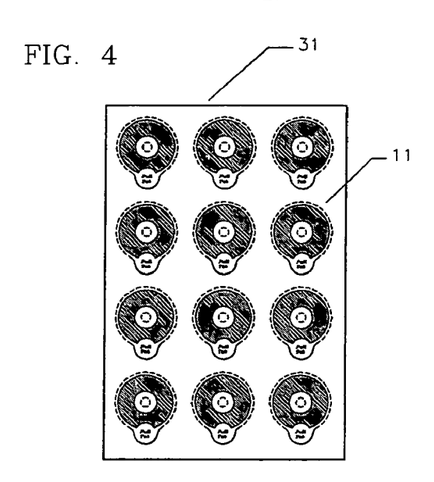
FIG. 4 depicts a top view of a sheet of removable insect barrier(s)

Referring to FIGS. 1 through 4, there is shown a simple, completely disposable embodiment of the ant deterring device 11 consisting of the disposable media 27, i.e. paper, vinyl, thin-flexible foam, Tyvek®, etc. with the applied insect deterring (non-drying) adhesive pattern 13. The device 11 has a center hole cut out as shown at 19 and a clearly identified non-adhesive coated region 15 for convenient handling. FIG. 3 shows a section view of the device 11 where the bottom layer or media 27 is shown under non-drying adhesive layer 25 and a low surface adhesion contact paper covering 23 that allows for convenient handling. FIG. 4 shows a sheet 31 consisting of a multiple of the ant deterring devices 11. The sheet 31 is perforated to allow for the convenient removal of the devices 11. Although not shown in FIG. 4 the sheet 31 is protected with a top layer of similarly perforated contact (low adhesion paper as is commonly used with self-adhesive labels) paper. This contact paper 23 allows for removing the devices 11 and their subsequent handling without the user coming into contact with the very sticky, non-drying adhesive 13. The protective contact paper 23 is easily removed after pulling the device 11 from the sheet 31.

Figure 5:
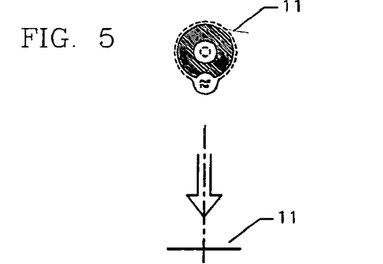
FIG. 5 depicts a top and side view of an insect barrier removed from the sheet of FIG. 4.
Figure 6:
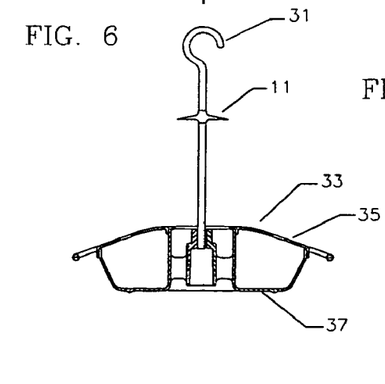
FIG. 6 depicts a side view of the insect barrier pushed over a nectar feeder hanging hook.
Figure 7:
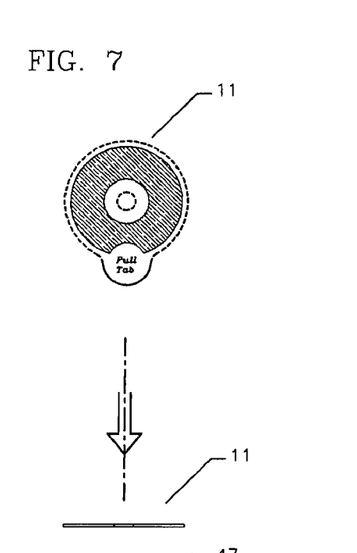
FIG. 7 depicts a top and side view of the insect barrier of FIG. 1.
Figure 8:
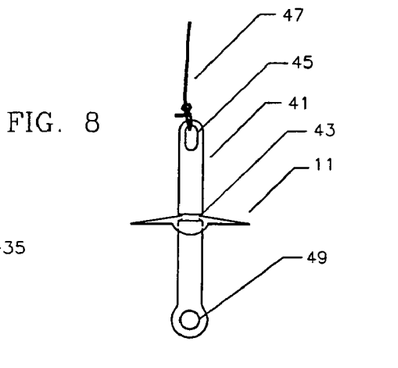
FIG. 8 depicts a side view of the insect barrier of FIG. 1 fitted over a mounting stem.

As shown in FIGS. 5 and 6 the device 11 may be interference fitted over the hanging hook 31 of the nectar feeder 33. Alternatively, as shown in FIGS. 7 and 8 the device 11 may be positioned on a mounting stem 41 at the slightly undercut region shown at 43. The mounting stem 44 has an upper eyelet 45 for attaching the hanging cord 47 or other hanging hardware. The mounting stem 41 has a lower eyelet as shown at 49 for the feeder hanging hook 31 or for use with other feeder hanging hardware.

The ant deterring device 11 is provided with a center hole at 19 for interference fitting with the feeder hanging hook 31 or the mounting stem 41. It is desirable that the device 11 mounting hole 19 have some resilient elasticity to form a continuous contact point or impassable barrier at the mounting point. The vinyl, Tyvek® and thin-flexible foam media 27 may be preferred for the device 11 as they will provide for some elastic expansion and securing friction of the mounting hole 19. An alternative configuration not shown, would use a flexible center grommet or other means to hold the ant deterring device 11 directly to the feeder hanging cord 47 or alternative feeder hanging hardware.

Figure 9:
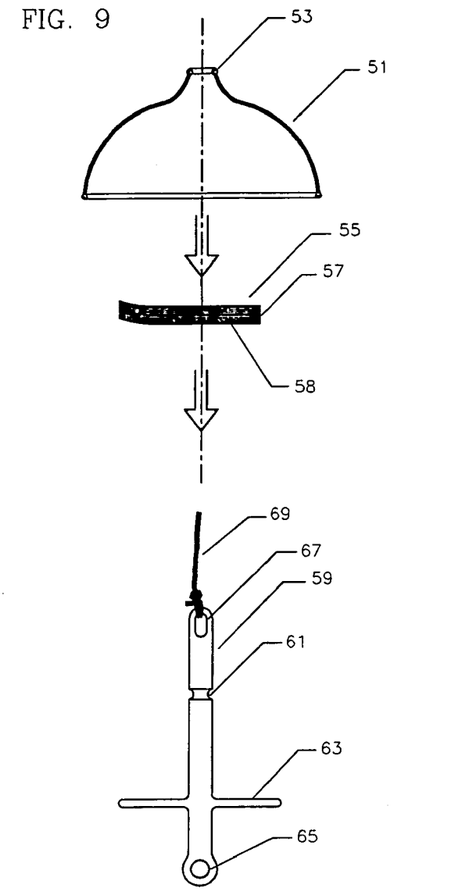
FIG. 9 depicts an exploded side view of a insect barrier with disposable media with a protective shroud, a stack of replaceable adhesive inserts and the assembly supporting mounting stem.
Figure 10:
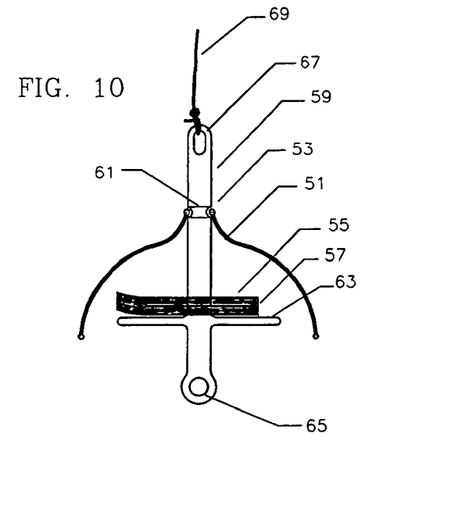
FIG. 10 depicts a side view of the assembled insect barrier with disposable media of FIG. 9.

Referring to FIGS. 9 and 10 there is shown a side view of the exploded and assembled drawing of the ant deterring device consisting of a media mounting stem 59 with a circular platform 63 designed to support the mounting of a self adhesive stack 55 of insect deterring media disks 57. The stem has an undercut groove 61 adapted for the installation of a removable dust shroud 51 at reduced diameter boss 53. The ant deterring device has an upper eyelet 67 and lower eyelet 65 for hanging cord 69 and/or other hanging hardware. The stack 55 of adhesive disks has a contact adhesive at the bottom surface shown at 58 to keep it secure on the mounting stem 59 platform 63. The media disks are configured of a two sided paper with a contact paper surface on the bottom side and a more porous or rougher (paper texture that will hold the non-drying adhesive) surface on the top side. This configuration allows for the entire media stack 55 to stay adhered together until each media disk 57 is removed from the top of the stack. The ant deterring device is long lasting (protected from dust) and easily renewed by pulling the "worn out" insect deterring adhesive disk 57 from the top of the stack 55.

Figure 11:
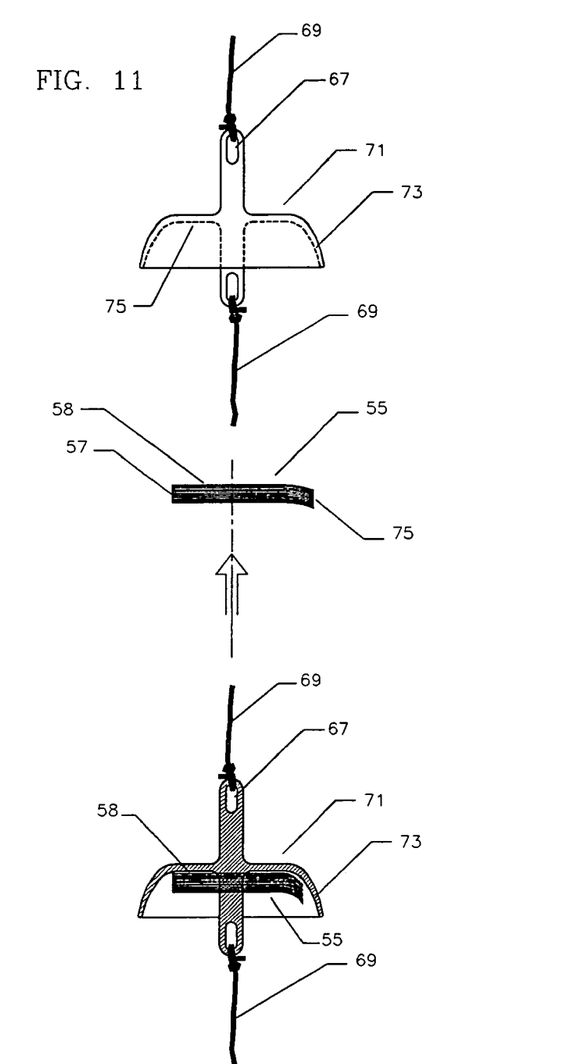
FIG. 11 depicts a side view of the exploded and assembled insect barrier with disposable adhesive inserts with integral dust shroud.
Figure 12:
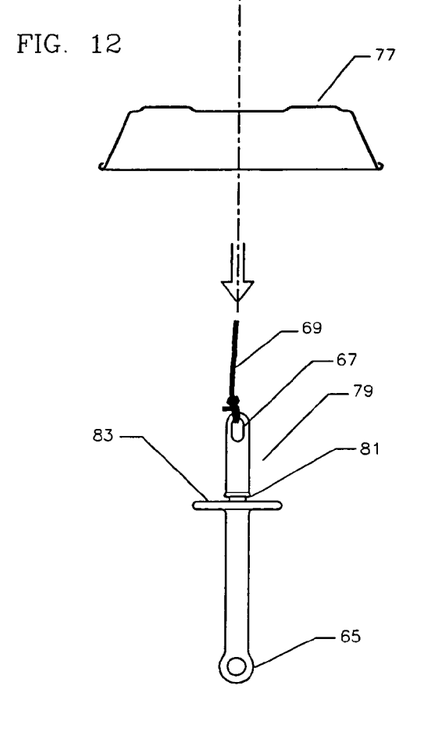
FIG. 12 depicts an exploded side view of the insect barrier with an inverted cup form disposable media.
Figure 13:
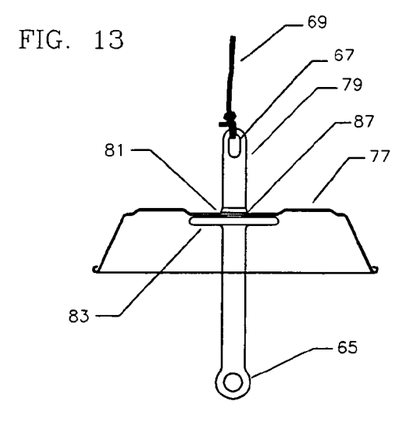
FIG. 13 depicts an assembled side view of the device of FIG. 12.

The FIG. 11 shows an assembled side view drawing of an ant deterring device 71 with an integral dust shroud 73. The inside bottom surface 75 of the device 71 is adapted to receive a stack 55 of self-adhesive insect deterring media disks 57. The stack 55 of insect deterring disks 57 has a self adhesive surface at 58 that holds the stack to the inside bottom surface 75 of the device 71. The device 71 has upper and lower eyelets for attachment of a hanging cord 69 or other suitable hanging hardware.

Figure 14:
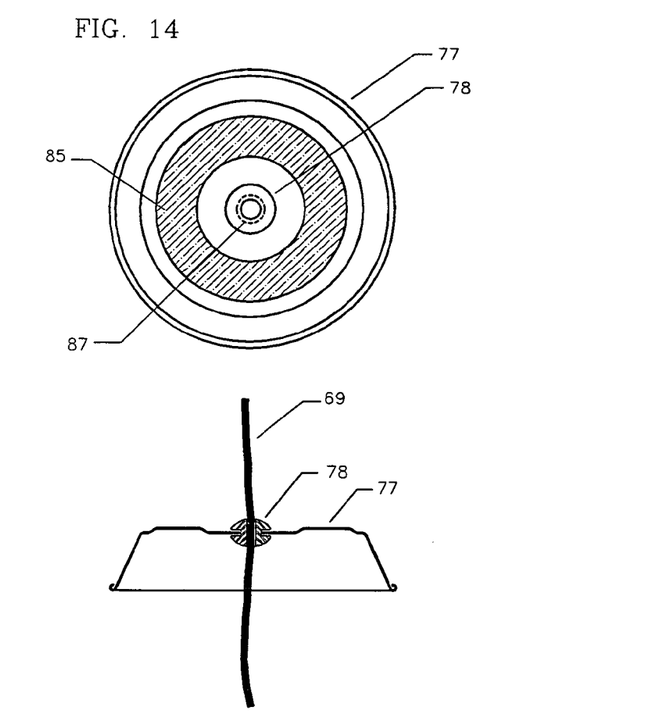
FIG. 14 depicts the underside and side view of the disposable, adhesive coated cup form with resilient grommet and feeder hanging cord.
Figure 15:
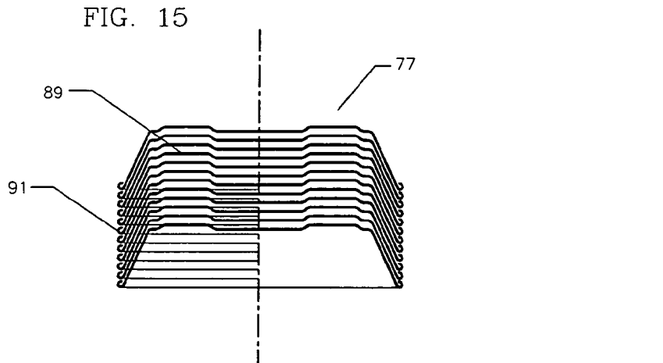
FIG. 15 depicts a side view of a nested stack of the disposable, adhesive coated cup forms of FIG. 12.

Referring to FIGS. 12 through 15 there is shown an embodiment of the ant deterring device with mounting stem 79 adapted to hold an insect deterring adhesive coated cup form 77. The disposable cup form 77 has a coating of insect deterrent adhesive applied in an annular ring as seen at 85. The cup form 77 has a center hole 87 adapted to interference fit over the mounting stem 79 at the undercut groove 81. The mounting stem 79 has a circular supporting platform 83 which acts to support the cup form 77. The mounting stem 79 has an upper eyelet 67 for attaching the feeder cord 69 and a lower eyelet 65 adapted for the feeder hook 31 or other suitable hanging hardware. FIG. 15 shows the nested stacking of the adhesive coated cups. The cup form 77 bottom is configured to protect the insect deterring adhesive 85 from making contact with the inside or outside of the adjacent nested cups 77 as shown at 89. The adhesive coated cups 77 may be manufactured with a roll-folded edge 91 using conventional thermo-forming processes or by any other common cup forming processes. The insect deterring adhesive coated cups are very easily replaced when the adhesive becomes ineffective or the cups become excessively weathered. Although the cup form 77 of the insect deterring device is shown in conjunction with a mounting stem 79, the cup form may have a center hole 87 that is sized to be interference fitted with the feeder hook or hanging cord. As shown in FIG. 14, the cup 77 mounting hole 87 may even be fitted with a resilient grommet 78 or affixed flexible washer to facilitate a friction fit between the device and the feeder hook, hanging cord 69, or other feeder support structure.

Figure 16:
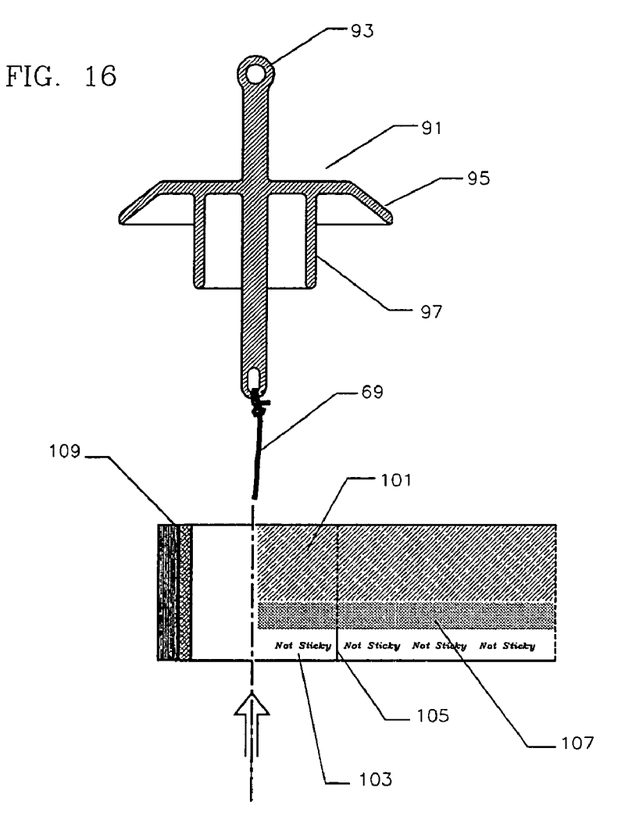
FIG. 16 depicts an exploded side view of the adhesive coated insect barrier that is adapted to hold a tape roll.
Figure 17:
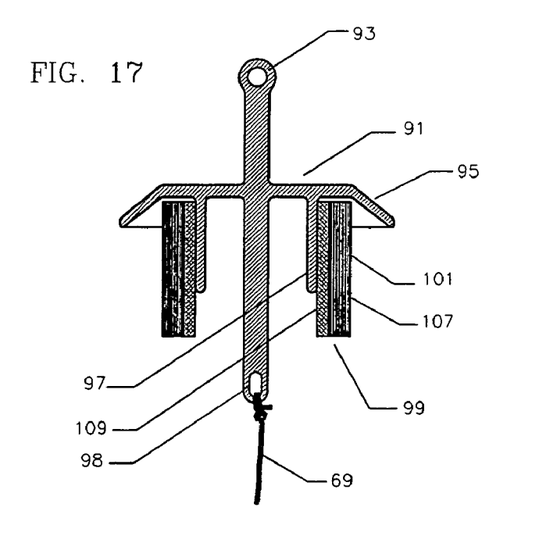
FIG. 17 depicts a side view of the assembled adhesive coated insect barrier with tape roll of FIG. 16.

Referring to FIGS. 16 and 17 there is shown an embodiment of the ant deterring device 91 which is configured for the installation of an insect deterring tape roll 99. This tape roll 99 is very similar in configuration to the tape configuration that is used for lint rollers, only it is much smaller and with an applied adhesive that is somewhat thicker or more tacky. The device 91 has an integral dust/rain shroud 95 and an internal cylindrical form 97 over which the cardboard core 109 of the insect deterring tape roll 99 can be interference fitted. The ant deterring device 91 has an upper eyelet 93 and lower eyelet 98. The insect deterring tape roll 99 has serrations at shown at 105 to assist stripping off sections of the used tape. The tape 99 may be manufactured with just an insect deterring adhesive band 101 or the unique combination of the insect deterring adhesive and a region 107 of applied diatomaceous earth. The diatomaceous earth 107 is a non-toxic mechanical insect killing substance that kills insects by scratching and or piercing the insect's exo-skeleton with the microscopic remains (extremely small shards of silica) of diatoms. The insects with the damaged exo-skeletons simply dry out and die. Diatomaceous earth is non-toxic to virtually all life forms except insects (it is actually used in small quantities in animal feeds as a additive to kill insects). The combination of a non-drying adhesive 101 adjacent to the diatomaceous earth band 107, on the tape 99, should result in an dramatically enhanced insect killing effect of the diatomaceous earth. This enhanced effect will result from the exertion of force and action against the diatomaceous earth as the ants (insects) struggle to free themselves from the adhesive band. The combination of insect deterring adhesive placed adjacent to a diatomaceous earth treated region may prove to have numerous other insect killing applications, especially if supplied as a flexible, adhesive backed tape. These other insect killing applications are outside the scope of this patent application.

Figure 18:
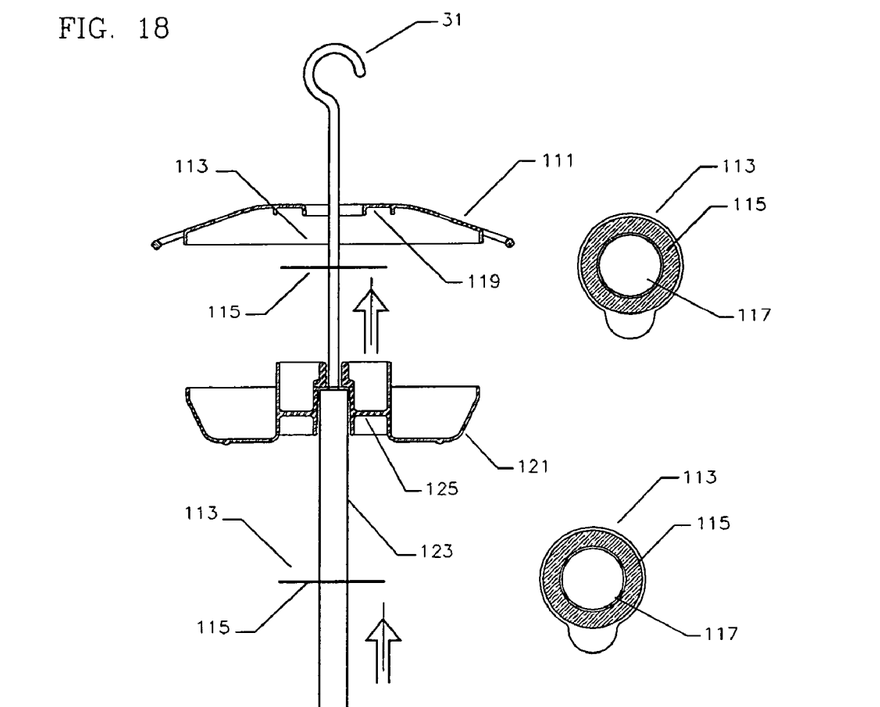
FIG. 18 depicts an exploded side view of a nectar feeder with both the top and bowl having adapted annular surfaces for mounting a disposable, adhesive coated insect barrier.

Referring to the FIG. 18, there is shown a feeder with a removable top 111 and nectar reservoir (bowl) 121. The underside of the feeder top 111 is adapted to receive an annular (center hole in disposable media 115, shown at 117) shaped insect deterring adhesive disk 113 at the underside surface as shown at 119. This insect deterring disk 113 is protected from rain and dust by the feeder top 111 and will be an effective insect deterrent when the feeder is hung from above by the hook 31. In a similar manner the feeder bowl 121 has a lower surface adapted to receive an annular (center hole at 117) shaped insect deterring adhesive disk 113 at the underside surface as shown at 125. This insect deterring disk 113 is protected from rain and dust by the feeder bowl 121 and will be an effective insect deterrent when the feeder is pole 123 mounted.

Figure 19:
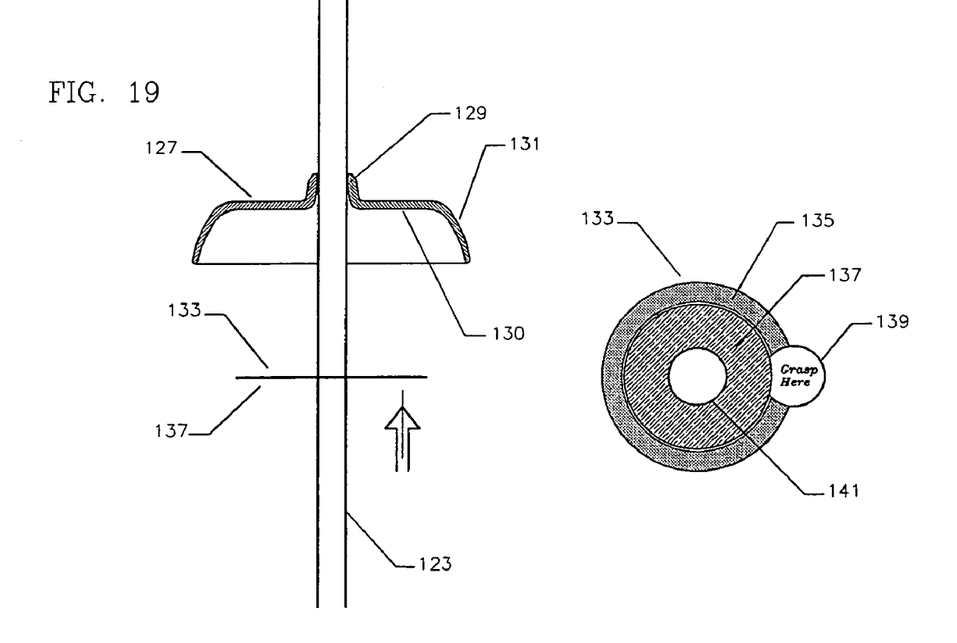
FIG. 19 depicts an exploded side view of the insect deterring device and disposable media insert adapted for mounting with a feeder supporting pole.

Referring to FIG. 19, there is shown an insect deterring device 131 configured to interference fit a typical feeder mounting pole 123 as shown at 129. The device 131 has an underside surface at 130 for contact adhesive attachment of a disposable, insect deterring adhesive disk 133. The disposable, insect deterring disk 133 has a center cutout 141 an adhesive coating 137, a surrounding application of diatomaceous earth, and untreated region at the tab 139 for convenient handling. The insect deterring device 131 is fabricated from a resilient, weather resistant material such as silicone rubber or flexible PVC.

Figure 20:
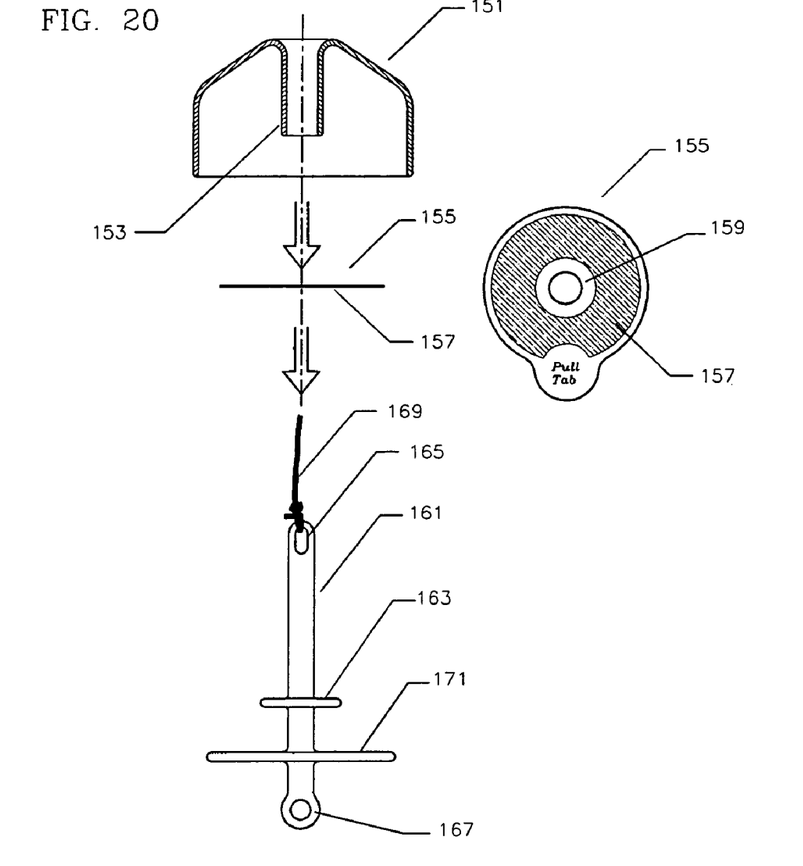
FIG. 20 depicts an exploded side view of the insect deterring device that includes a dust cover, disposable media insert, and a mounting stem with integral baffle plate.
Figure 21:
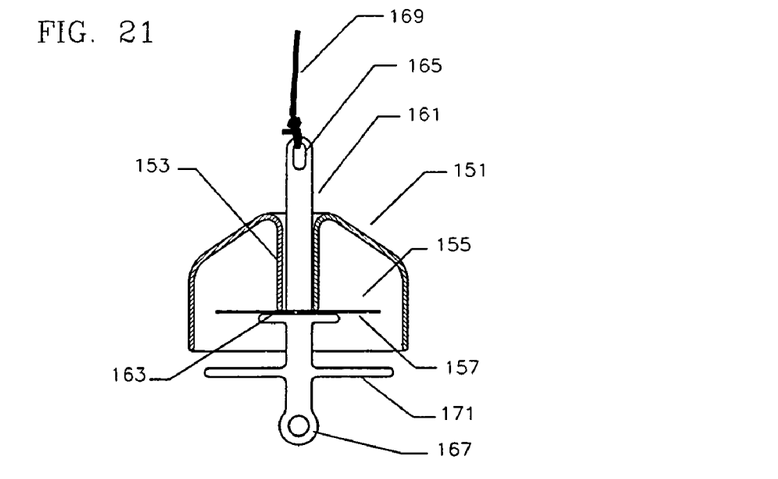
FIG. 21 depicts a side view of the assembled insect deterring device of FIG. 20.
Figure 22:
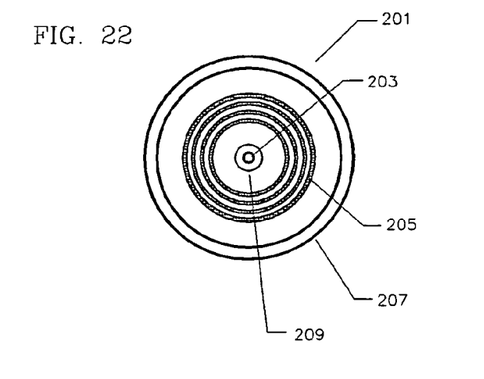
FIG. 22 depicts an underside view of a disposable insect barrier device with a direct application of non-drying adhesive.
Figure 23:
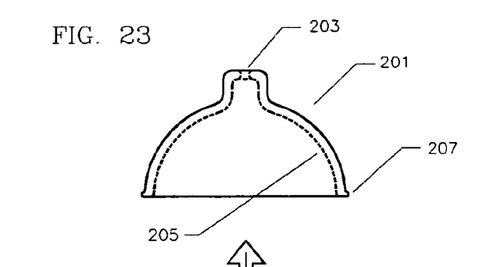
FIG. 23 depicts a side view of the disposable insect barrier device of FIG. 22.
Figure 24:
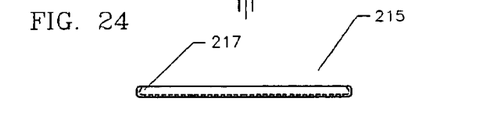
FIG. 24 depicts a side view of a protective dust cover adapted to fit over the disposable insect barrier device.
Figure 25:
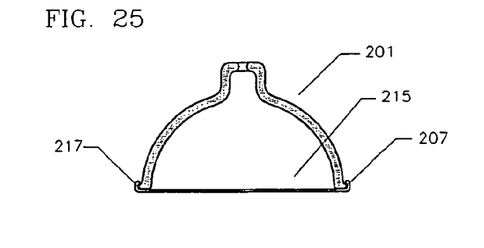
FIG. 25 depicts a half cross-sectional view of the disposable insect barrier device with the protective dust cover attached.

Referring to FIGS. 20 and 21, there is shown a section view of an embodiment of the insect deterring device which incorporates a removable rain/dust cover 151 that slides over a central mounting stem 161. The mounting stem 161 has an upper eyelet 165 adapted for hanging cord 169 and a lower eyelet 167 adapted for a feeder hook or other mounting hardware. The mounting stem 161 has an integral platform 163 which is adapted to support a disposable adhesive disk 155 with applied insect deterring adhesive 157 and center hole cutout at 159. This device uses the weight of the rain/dust cover 151 and/or an interference fit between the mounting stem 161 and the rain/dust cover 151 as seen at 153 to hold the disposable adhesive disk 155 in place. The mounting stem 161 has an integral baffle plate 171 to restrict the airflow (and associated dust) up into the rain/dust cover 151. This integral baffle plate 171 will extend the effective service life of the insect deterring adhesive disk 155 in particularly dusty regions.

Although not specifically illustrated throughout this disclosure, it should be noted that the disposable media(s) with one side having an applied insect deterring adhesive coating may be held in place in the various insect barrier devices by use of a contact adhesive applied to the mounting side of the media (as is common with double sided tapes). There are any number of other common means, including clips, resilient bands, frictional contact or groove interference of a cutout hole that may be used to mount and hold the insect deterring media in these devices.

Increasingly, there is a trend in consumer products design toward products that are discarded following their use or effective service life. This trend, coupled with low cost manufacturing of high volume consumer products, can lead to some ambiguity as to what constitutes a "disposable" product or product component. Having made this point, it is reasonable to assume that a completely disposable design of this insect barrier invention, one that foregoes the necessity to install, replace or otherwise handle any non-drying adhesive coated media, may be preferred by some consumers.

Figure 26:
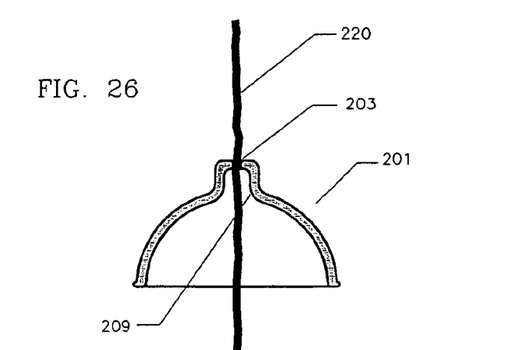
FIG. 26 depicts a half cross-sectional view of the disposable insect barrier device friction fitted over a nectar feeder hanging cord.
Figure 27:
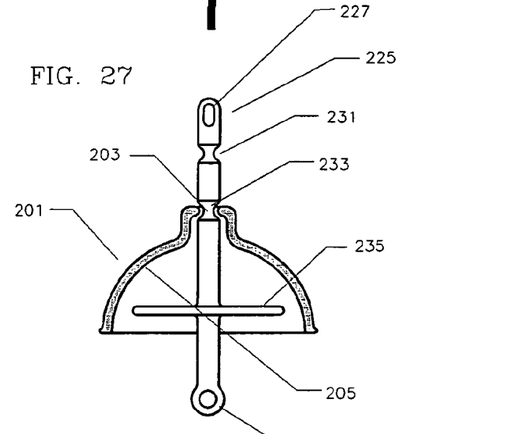
FIG. 27 depicts a half cross-sectional view of the disposable insect barrier device positioned for handling and/or storage over a specifically adapted mounting stem.
Figure 28:
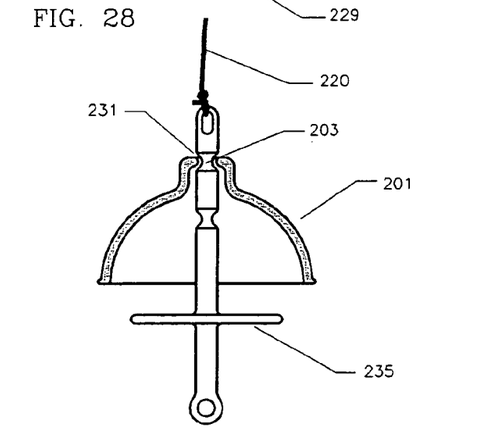
FIG. 28 depicts a half cross-sectional view of the disposable insect barrier device positioned for use over a specifically adapted mounting stem.

Referring to the FIGS. 22 through 25 there is shown a "disposable" insect (ant) deterring device 201 with a mounting hole 203 and directly applied, non drying adhesive as shown at 205. The non-drying adhesive may be applied in virtually any pattern or band width with an unbroken perimeter. The non-drying adhesive should be sparingly applied to avoid excessive amounts that may serve to trap rather than deter insects (ants). It is also important to avoid excessive amounts in order to limit any possibility that the non-drying adhesive may migrate from the original application point. This device 201 has an incorporated lip 207 adapted to snap fit with the dust cover 215 undercut groove 217 shown in the FIGS. 24 and 25. Referring to FIG. 26, the insect deterring device 201 is shown held in place using a friction fit with the incorporated mounting hole 203 and the feeder supporting cord 220. The insect deterring device 201 is shaped with a slightly restricted form at 209 to limit any sideways pivoting action during periods of high wind. Excessive pivoting of the device is undesirable as it may cause some larger varieties of ants to lose their grip and fall onto the nectar feeder below. It is advantageous for the insect deterring device 201 to be constructed from a pliable or semi-elastic material in order to facilitate a friction fit with feeder cords, cables and/or other feeder hanging hardware of somewhat varying cross sections. Referring to FIGS. 27 and 28, the insect deterring device 201 is supported by a mounting stem 225. The mounting stem 225 has an upper eyelet 227 and a lower eyelet 229 to allow for mounting the device interposed between the feeder and the feeder support or cord 220. The mounting stem 225 has an upper annular groove 231 and a lower groove 233 adapted to interference fit with the device 201 mounting hole 203. The barrier device 201 mounting hole 203 can be fitted to the lower groove 233 to locate the dust cover platform 235 to protect the non-drying adhesive coated surface 205 for shipping/handling and retail display. The barrier device mounting hole 203 is moved to the upper annular groove 231 when the device is to be used. In this "open" configuration the dust cover platform 235 is in the correct position to prevent excessive dust accumulation on the exposed non-drying adhesive. It is conceivable that the upper surface of the dust cover 235 may as an alternative, be coated with non-drying adhesive, but this configuration would not be preferred.

Figure 29:
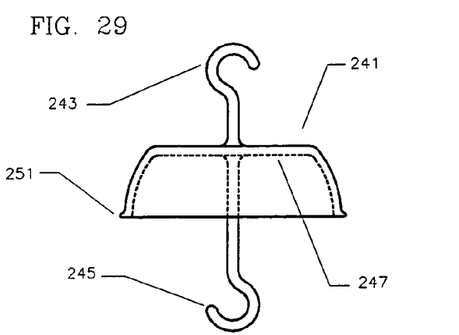
FIG. 29 depicts a side view of a disposable insect barrier device with integrally formed support.
Figure 30:
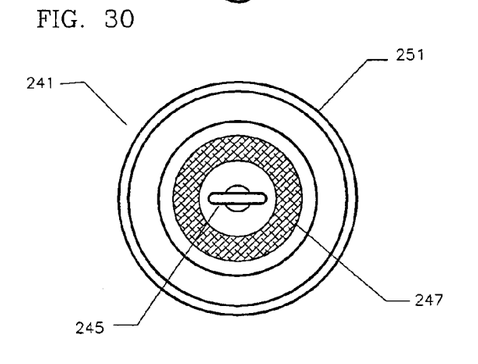
FIG. 30 depicts the underside view of the device of FIG. 29.
Figure 31:
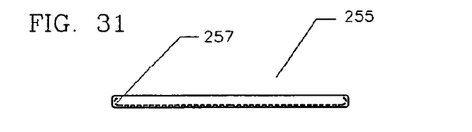
FIG. 31 depicts a side view of a protective dust cover adapted to fit over the disposable insect barrier device of FIGS. 29 and 30.
Figure 32:
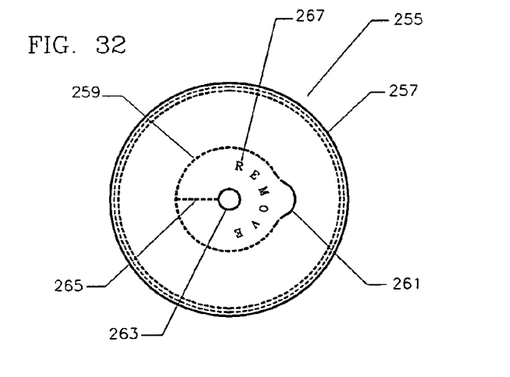
FIG. 32 depicts an underside (exposed) view of the protective dust cover of FIG. 31 with a tear out or removable panel.
Figure 33:
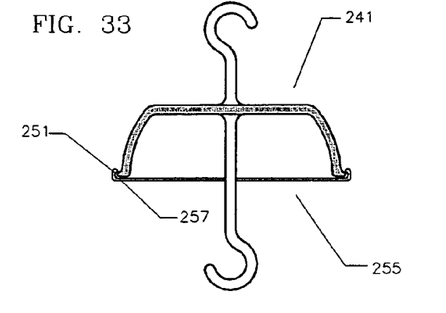
FIG. 33 depicts a half cross-sectional view of the disposable insect barrier device with integrally formed support with the protective dust cover attached.
Figure 34:
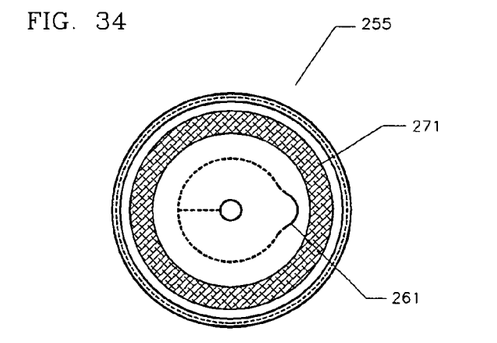
FIG. 34 depicts the inside of a protective dust cover of FIG. 32 with the addition of an applied non-drying adhesive.
Figure 35:
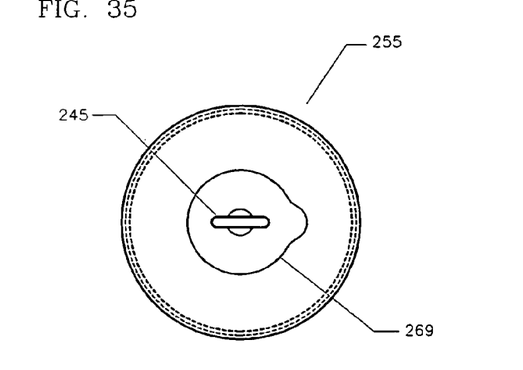
FIG. 35 depicts the underside of the assembly shown in FIG. 33 following the removal of the dust cover, tear out panel.

Referring to FIGS. 29 and 30 there is shown a disposable insect barrier device 241 with a direct application of non-drying adhesive 247. The insect barrier device 241 has an upper hook 243 and a lower hook 245 to allow for the device to be placed interposed between the feeder and the feeder support. As seen in FIGS. 31 and 33, the insect barrier device has an annular lip 251 adapted to snap fit with the undercut groove 257 of the dust/protective cover 255. Referring to FIG. 32, the dust/protective cover 255 is provided with a tear out panel 261 with a center hole and radial serration or through cut 265. The tear out panel 261 has incorporated graphics or instructions 267 with directions to remove the panel prior to hanging the device. The dust/protective cover may have other decorative graphics and/or directions for using the insect barrier device. The protective/dust cover 255 protects the non-drying adhesive 247 from inadvertent contact during shipping, handling and retail display. The tear out panel 261 is removed just prior to using the insect barrier device. The remaining portion of the protective dust cover 255 helps to extend the service life of the insect barrier device and also protects the birds from making contact with the non-drying adhesive coated surfaces. Referring to FIG. 34, the protective/dust cover 255 is shown with an interior application of non-drying adhesive 271. In this alternate configuration, the device may be supplied with just one protective/dust cover or a number of them, effectively extending the service life of the insect barrier device to multiple seasons. The FIG. 35 shows an underside view of the insect deterring device 241 ready for use, with the protective/dust cover 255 with the tear out panel 261 removed. It is necessary that the clearance between the edge 269 of the remaining protective/dust cover and the insect deterring device 241 lower hook 245 and stem to be sufficiently wide to prevent ants from getting across this gap.

It is important that in all of the insect barrier devices thus far disclosed, that the non-drying adhesive remains relatively "tacky" as ambient temperatures fall. Some non-drying adhesive formulations become hard and considerable less tacky as their temperature falls. Ants will typically try to get into nectar feeders at any time of day, but some species such as "ghost" ants are especially prone to come out and hunt for food at night. Using an adhesive formulation that loses too much of it's "tackiness" at reduced night time temperatures will render the barrier device inoperative.

Another important feature that should be considered in all of the insect barrier designs disclosed in this application, is that they should have a surface texture that is sufficiently textured or rough enough to prevent ants from losing their grip and falling on the feeder (when it is mounted below the device). This is not typically a problem with smaller ants, but the larger ant species can actually fall off some very smooth surfaces. It is also important that the insect deterring device surfaces that are directly adjacent to the non-drying adhesive have sufficient roughness so that ants can effectively "pull-away" from the adhesive, rather than getting held or trapped there.

I have now described my invention in considerable detail, however others skilled in the art can devise and develop alternate and equivalent constructions. Hence, I desire my protection to be limited not by the constructions illustrated and described, but only by the proper scope of the appended claims.

I claim:

1. In combination with a nectar type bird feeder, an insect barrier for use in preventing insect contamination of nectar type bird feeders, said insect barrier including:
   a water resistant device, pre-coated on at least one surface with a non-drying adhesive, said non-drying adhesive being sufficiently tacky to act as a physical barrier to the passage of insects, said feeder including a mounting means positioned proximate the top of the feeder comprising a cord or hook wherein said water resistant device is formed as an inverted cup provided with a mounting hole adapted to friction fit the device onto the mounting means so as to position the device between the nectar type feeder and a nectar feeder support, wherein said device is disposed to act as a physical barrier to block insects from crawling to the nectar type feeder, whereby upon sensing said non-drying adhesive the insects retreat.

2. The combination of claim 1, wherein said water resistant device includes a protective covering layer of low adhesion or contact paper.

3. The combination of claim 1, wherein said water resistant device includes a protective dust cover platform or lid.

4. The combination of claim 3, wherein said protective dust cover platform or lid has an application of non-drying adhesive.

5. The combination of claim 1, wherein said water resistant device has a handling region that is free from any adhesive coating.

6. The combination of claim 1, wherein said inverted cup is adapted to be mounted in an open and down position to prevent collection of water, dust or other debris.

7. The combination of claim 1, wherein a resilient washer or grommet is located at said mounting hole to provide an elastic interference fit with said mounting means.

8. The combination device of claim 1, wherein the non-drying adhesive comprises a coated media insert secured in position by means of a contact adhesive surface coating applied to a surface of said insert opposite said non-drying adhesive, and placed in contact with an inside surface or supporting structure of said water resistant device.

9. The combination of claim 1, wherein said water resistant device has an application of diatomaceous earth.

10. The combination device of claim 8, wherein the non-drying adhesive coated media insert is in the form of a tape, the exposed tape surface having an adhesive layer sufficiently tacky to act as a physical barrier to the passage of insects.

11. The combination of claim 1, wherein the mounting means comprises hooks or eyelets.

\* \* \* \* \*